(12) United States Patent
Kim et al.

(10) Patent No.: US 11,064,412 B2
(45) Date of Patent: *Jul. 13, 2021

(54) METHOD AND DEVICE FOR PERFORMING CELL RESELECTION BY TERMINAL

(71) Applicant: LG ELECTRONICS INC., Seoul (KR)

(72) Inventors: Sangwon Kim, Seoul (KR); Youngdae Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 12 days.

This patent is subject to a terminal disclaimer.

(21) Appl. No.: 16/729,008

(22) Filed: Dec. 27, 2019

(65) Prior Publication Data

US 2020/0137652 A1 Apr. 30, 2020

Related U.S. Application Data

(63) Continuation of application No. 15/755,512, filed as application No. PCT/KR2016/009311 on Aug. 23, 2016, now Pat. No. 10,531,348.

(60) Provisional application No. 62/211,860, filed on Aug. 30, 2015.

(51) Int. Cl.
*H04W 36/08* (2009.01)
*H04W 48/08* (2009.01)
*H04W 48/20* (2009.01)
*H04W 24/08* (2009.01)
(Continued)

(52) U.S. Cl.
CPC .......... *H04W 36/08* (2013.01); *H04W 24/08* (2013.01); *H04W 36/30* (2013.01); *H04W 48/08* (2013.01); *H04W 48/16* (2013.01); *H04W 48/20* (2013.01)

(58) Field of Classification Search
None
See application file for complete search history.

(56) References Cited

U.S. PATENT DOCUMENTS

| 10,531,348 B2 | 1/2020 | Kim et al. |
| 2001/0011019 A1 | 8/2001 | Jokimies |
| 2002/0111166 A1 | 8/2002 | Monroe |

(Continued)

FOREIGN PATENT DOCUMENTS

| CN | 101772110 | 7/2010 |
| CN | 102572984 | 7/2012 |

(Continued)

OTHER PUBLICATIONS

U.S. Appl. No. 15/755,512, Notice of Allowance dated Aug. 28, 2019, 10 pages.

(Continued)

*Primary Examiner* — Faruk Hamza
*Assistant Examiner* — Cassandra L Decker
(74) *Attorney, Agent, or Firm* — Lee, Hong, Degerman, Kang & Waimey

(57) ABSTRACT

Provided are a method for performing cell reselection by a terminal in a wireless communication system and a device for supporting same. The terminal detects a single-cell point-to-multipoint (SCPTM) cell of interest, calculates the ranking of the SCPTM cell of interest, and performs cell reselection on the basis of the calculated ranking. The ranking of the SCPTM cell of interest can be calculated by means of applying a cell-specific priority (CSP).

15 Claims, 9 Drawing Sheets

(51) Int. Cl.
*H04W 48/16* (2009.01)
*H04W 36/30* (2009.01)

(56) References Cited

U.S. PATENT DOCUMENTS

| | | |
|---|---|---|
| 2006/0160541 A1 | 7/2006 | Ryu |
| 2010/0067375 A1 | 3/2010 | Ianev |
| 2010/0232340 A1* | 9/2010 | Godor ............... H04L 67/322 370/312 |
| 2010/0309836 A1 | 12/2010 | Sugawara et al. |
| 2013/0183973 A1 | 7/2013 | Amerga et al. |
| 2013/0308497 A1* | 11/2013 | Novak ............... H04W 48/20 370/259 |
| 2015/0080043 A1* | 3/2015 | Wang ............... H04W 48/16 455/509 |
| 2015/0327133 A1 | 11/2015 | Yiu et al. |
| 2016/0227383 A1* | 8/2016 | Lin ............... H04W 4/06 |
| 2016/0286439 A1 | 9/2016 | Zhao et al. |
| 2017/0135005 A1 | 5/2017 | Basu Mallick et al. |
| 2017/0078991 A1 | 6/2017 | Chae et al. |
| 2018/0270723 A1 | 9/2018 | Kim et al. |

FOREIGN PATENT DOCUMENTS

| | | |
|---|---|---|
| CN | 102740389 | 10/2012 |
| CN | 102752826 | 10/2012 |
| CN | 104066131 | 9/2014 |
| EP | 2239968 | 10/2010 |
| KR | 20090033313 | 4/2009 |
| KR | 20120018818 | 3/2012 |
| WO | 2008059994 | 5/2008 |
| WO | 2014182209 | 11/2014 |

OTHER PUBLICATIONS

U.S. Appl. No. 15/755,512, Office Action dated Mar. 15, 2019, 17 pages.
State Intellectual Property Office of the People's Republic of China Application Serial No. 201680054855.X, Office Action dated Mar. 25, 2020, 9 pages.
PCT International Application No. PCT/KR2016/009311, Written Opinion of the International Searching Authority dated Nov. 11, 2016, 4 pages.
3rd Generation Partnership Project (3GPP), "Technical Specification Group Radio Access Network; Evolved Universal Terrestrial Radio Access (E-UTRA); Study on single-cell point-to-mulitpoint transmission for E-UTRA (Release 13)," 3GPP TR 36.890 V13.0.0, Jul. 2015, 33 pages.
Ericsson, "Cell-specific prioritisation at reselection," 3GPP TSG-RAN WG2 #82, R2-131668, May 2013, 7 pages.
European Patent Office Application Serial No. 16842177.4, Search Report dated Jan. 17, 2019, 10 pages.

* cited by examiner

FIG. 3
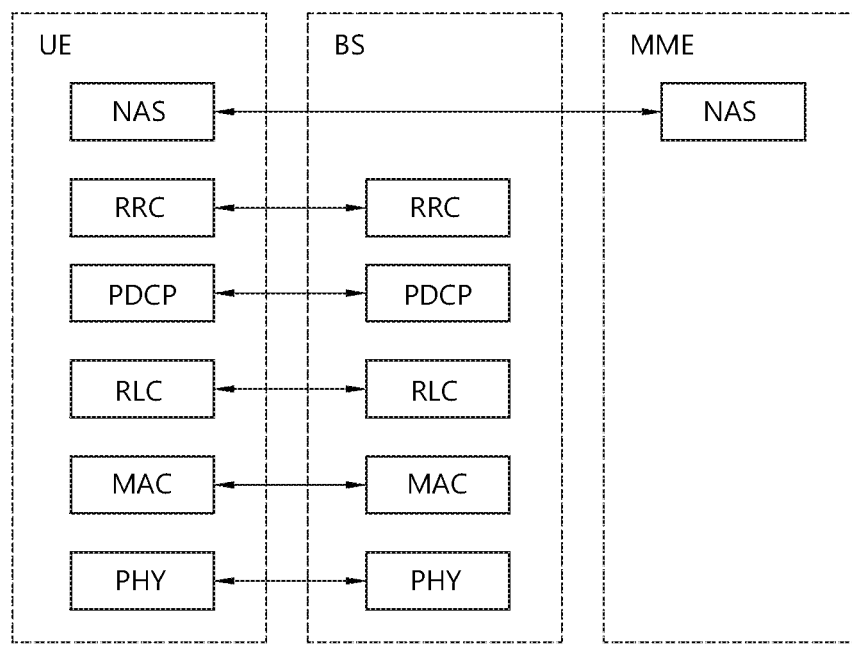
(a)
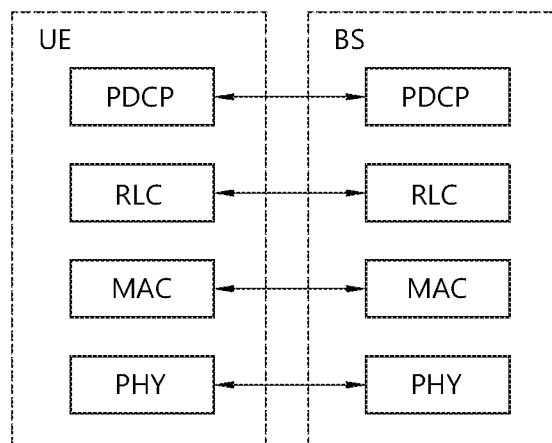
(b)

METHOD AND DEVICE FOR PERFORMING CELL RESELECTION BY TERMINAL

CROSS-REFERENCE TO RELATED APPLICATIONS

This application is a continuation of U.S. patent application Ser. No. 15/755,512, filed on Feb. 26, 2018, now U.S. Pat. No. 10,531,348, which is the National Stage filing under 35 U.S.C. 371 of International Application No. PCT/KR2016/009311, filed on Aug. 23, 2016, which claims the benefit of U.S. Provisional Application No. 62/211,860, filed on Aug. 30, 2015, the contents of which are all hereby incorporated by reference herein in their entirety.

BACKGROUND OF THE INVENTION

Field of the invention

The present invention relates to a wireless communication system, and more particularly, to a method of performing cell reselection by a UE, and an apparatus supporting the method.

Related Art

3rd Generation Partnership Project (3GPP) Long Term Evolution (LTE) that is an advancement of Universal Mobile Telecommunication System (UMTS) is being introduced with 3GPP release 8. In 3GPP LTE, orthogonal frequency division multiple access (OFDMA) is used for downlink, and single carrier-frequency division multiple access (SC-FDMA) is used for uplink. The 3GPP LTE adopts multiple input multiple output (MIMO) having maximum four antennas. Recently, a discussion of 3GPP LTE-Advanced (LTE-A) which is the evolution of the 3GPP LTE is in progress.

A Multimedia Broadcast/Multicast Service (MBMS) is a service of simultaneously transmitting a data packet to a plurality of users, similar to an existing Cell Broadcast Service (CBS). However, the CBS is a low-speed message-based service, while the MBMS is designed for high-speed multimedia data transmission. Further, the CBS is not Internet Protocol (IP)-based, whereas the MBMS is based on IP multicast. According to the MBMS, when users of a certain level are present in the same cell, the users are allowed to receive the same multimedia data using a shared resource (or channel), and thus the efficiency of radio resources may be improved and the users may use a multimedia service at low costs.

The MBMS uses a shared channel so that a plurality of UEs efficiently receives data on one service. A BS allocates only one shared channel for data on one service, instead of allocating as many dedicated channels as the number of UEs to receive the service in one cell. The plurality of UEs simultaneously receives the shared channel, thus improving the efficiency of radio resources. Regarding the MBMS, a UE may receive the MBMS after receiving system information on the cell.

An important communication technique such as public safety or group communication system enablers for LTE (GCSE_LTE) has been introduced in Rel-12. In Rel-12 GCSE, group communication has been designated as eMBMS. The eMBMS is designed to supply media content to a pre-planned wide area (i.e., an MBSFN area). The MBSFN area is rather static (e.g., configured by O&M), and cannot be dynamically adjusted according to user distribution. Even if all radio resources of a frequency domain is not used, eMBMS transmission may occupy a full system bandwidth, and multiplexing with unicast is not allowed in the same subframe. An MBSFN subframe configuration is also rather static (e.g., configured by O&M). That is, an MBSFN subframe cannot be dynamically adjusted according to the number of dynamic groups and a traffic load of a dynamic group. Therefore, when providing an importance communication service, a radio resource configuration for the eMBMS may be unnecessarily wasted. Therefore, single-cell point-to-multipoint (SCPTM) transmission is proposed for an effective use of the radio resource. While identifiable signals are transmitted simultaneously in a plurality of cells in the MBSFN transmission, the MBMS service is transmitted in a single cell in the SCPTM transmission.

SUMMARY OF THE INVENTION

In case of a UE which receives a service through single-cell point-to-multipoint (SCPTM) in an RRC_IDLE mode, if the UE performs cell reselection to another cell which does not provide the service through the SCPTM, the UE may experience a service failure until the service is received through unicast. Therefore, the UE needs to preferentially select a cell which provides the service through the SCTPM in order to avoid the service failure. That is, there is a need to newly propose a cell reselection procedure for the UE which receives the service through the SCPTM.

According to an embodiment, a method of performing cell reselection by a UE in a wireless communication system is provided. The UE may receive assistant information including a cell specific priority (CSP), detect an SCPTM cell of interest, calculate a ranking for the SCPTM cell of interest, and perform the cell reselection on the basis of the calculated ranking. The ranking for the SCPTM cell of interest may be calculated by applying the CSP.

The ranking for the SCPTM cell of interest may be defined by:

$$R = Q\text{meas} - Q\text{offset} - Q\text{offsettemp} + \text{CSP}.$$

Herein, R may be a ranking for the SCPTM cell of interest, Qmeas may be RSRP measurement quantity used in cell reselection, Qoffset may be an offset applied to a cell, Qoffsettemp may be an offset applied temporarily to the cell, and CSP may be a CSP for the SCPTM cell of interest.

The method may further include calculating by the UE a ranking for the remaining cells other than the SCPTM cell of interest. The ranking for the remaining cells may be calculated without having to apply the CSP.

The SCPTM cell of interest may be a cell which provides an SCPTM service of which reception is interested by the UE or an SCPTM service which is being received by the UE.

The method may further include performing, by the UE, measurement on a frequency of interest. The frequency of interest may be a frequency to which the SCPTM cell of interest belongs. A priority of the frequency of interest may be considered by the UE as the highest priority. A priority of the frequency of interest, RSRP of a serving cell, and RSPR of the serving cell may be not considered in the measurement on the frequency of interest.

The method may further include determining, by the UE, whether the SCPTM cell of interest exists near the UE on the basis of the assistant information. The assistant information may include a mapping relation between a cell ID and a service area identify (SAI) and a CSP corresponding to the cell ID. The assistant information may include a mapping relation between a cell ID and a temporary mobile group identifier (TMGI) and a CSP corresponding to the cell ID.

The method may further include, if it is determined that the SCPTM cell of interest exists near the UE, performing, by the UE, measurement on a frequency to which the SCTPM cell of interest belongs.

If the calculated ranking for the SCPTM cell of interest is high, the cell reselection may be performed to the SCPTM cell of interest. The method may further include receiving, by the UE, the SCPTM service of interest from the SCPTM cell of interest. A priority of a frequency to which the SCPTM cell of interest belongs may be considered by the UE as the highest priority while the SCPTM service of interest is received.

According to another embodiment, a UE performing cell reselection in a wireless communication system is provided. The UE may include: a memory; a transceiver, and a processor for coupling the memory and the transceiver. The processor may be configured to: control the transceiver to receive assistant information including a CSP; detect an SCPTM cell of interest; calculate a ranking for the SCPTM cell of interest, and perform the cell reselection on the basis of the calculated ranking, wherein the ranking for the SCPTM cell of interest is calculated by applying the CSP.

The processor may be configured to calculate a ranking for the remaining cells other than the SCPTM cell of interest. The ranking for the remaining cells may be calculated without having to apply the CSP.

A UE may preferentially reselect a cell which provides a single-cell point-to-multipoint (SCPTM) service.

BRIEF DESCRIPTION OF THE DRAWINGS

FIG. 3 shows a control plane and a user plane of a radio interface protocol of an LTE system.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
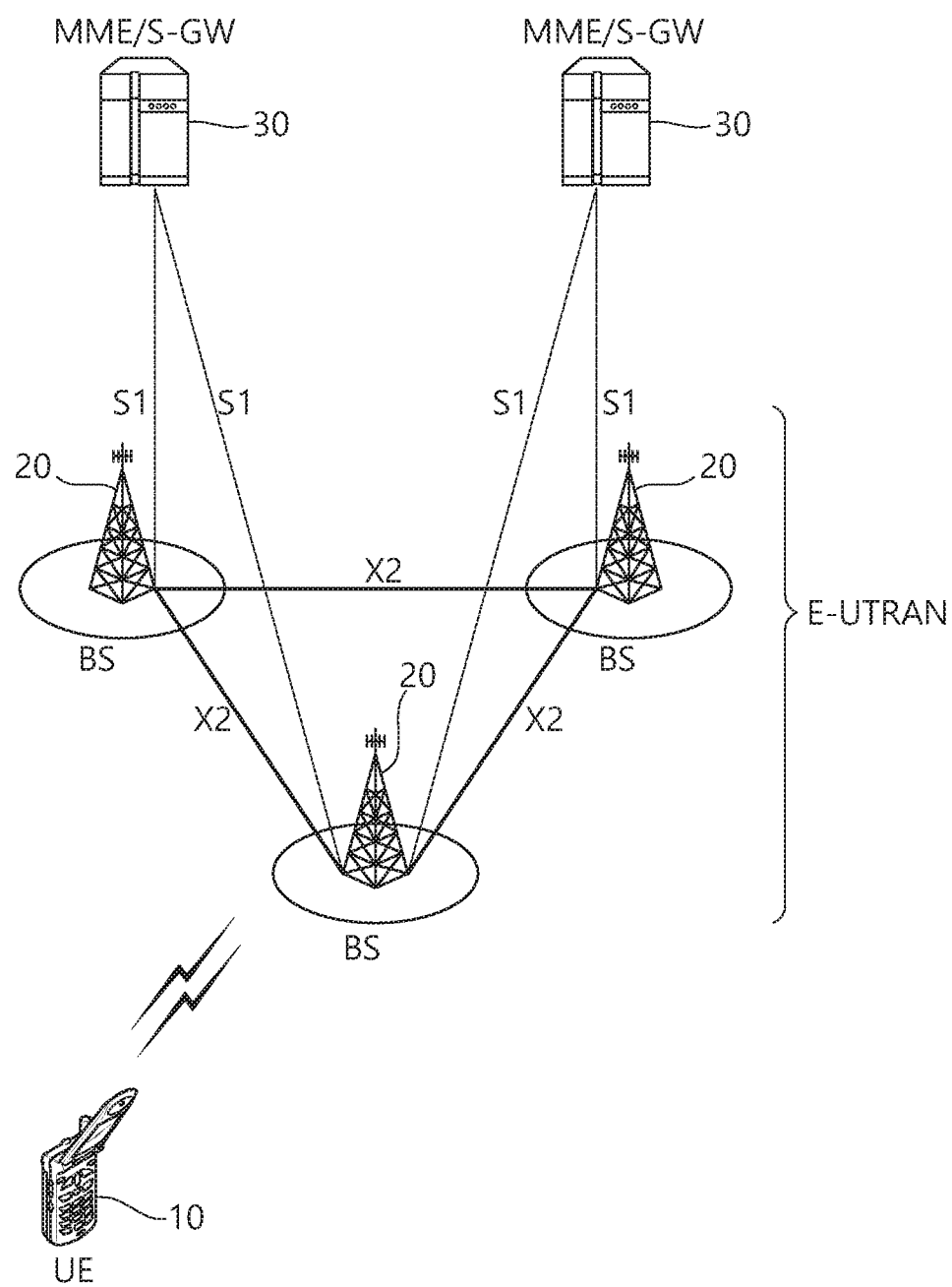
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
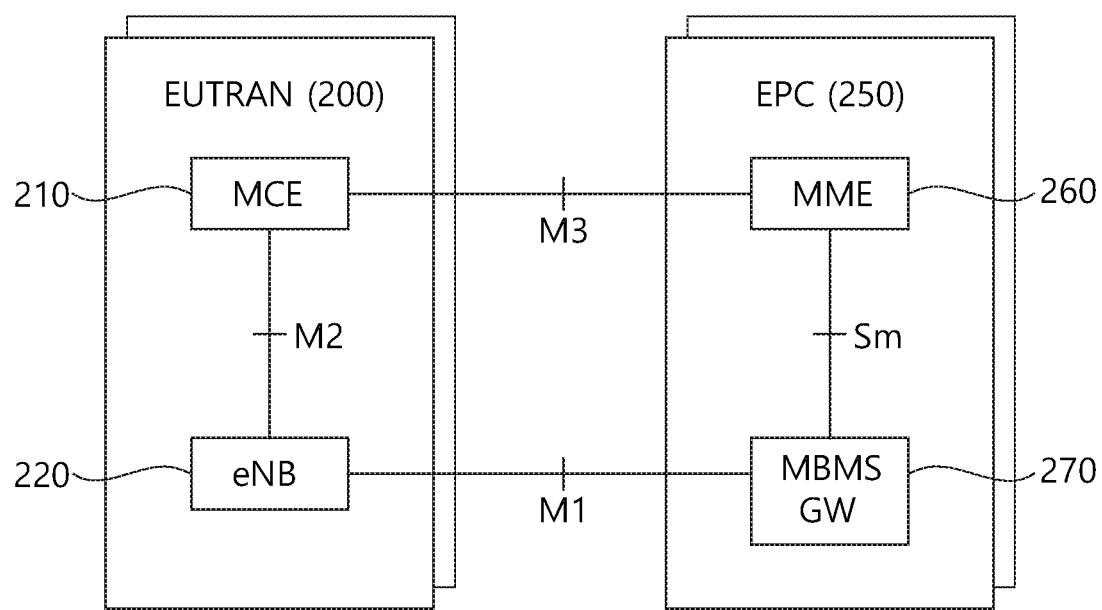
FIG. 2 shows a network architecture for an MBMS.

FIG. 2 shows a network architecture for a Multimedia Broadcast/Multicast Service (MBMS).

Referring to FIG. 2, the radio access network (EUTRAN) 200 includes a multi-cell coordination entity (hereinafter, "MCE") 210 and a base station (eNB) 220. The MCE 210 is a main entity for controlling the MBMS and plays a role to perform session management, radio resource allocation or admission control of the base station 220. The MCE 210 may be implemented in the base station 220 or may be implemented independent from the base station 220. The interface between the MCE 210 and the base station 220 is called M2 interface. The M2 interface is an internal control plane interface of the radio access network 200 and MBMS control information is transmitted through the M2 interface. In case the MCE 210 is implemented in the base station 220, the M2 interface may be present only logically.

The Evolved Packet Core (EPC) 250 includes an MME 260 and an MBMS gateway (GW) 270. The MBMS gateway 270 is an entity for transmitting MBMS service data and is positioned between the base station 220 and the BM-SC and performs MBMS packet transmission and broadcast to the base station 220. The MBMS gateway 270 uses a PDCP and IP multicast to transmit user data to the base station 220 and performs session control signaling for the radio access network 200.

The interface between the MME 260 and the MCE 210 is a control plane interface between the radio access network 200 and the EPC 250 and is called M3 interface. Control information related to MBMS session control is transmitted through the M3 interface. The MME 260 and the MCE 210 transmits, to the base station 220, session control signaling such as a session start/stop message for session start or session stop, and the base station 220 may inform the UE through a cell notification that the corresponding MBMS service has been started or stopped.

The interface between the base station 220 and the MBMS gateway 270 is a user plane interface and is called M1 interface.

FIG. 3 shows a control plane and a user plane of a radio interface protocol of an LTE system. FIG. 3(a) shows a control plane of a radio interface protocol of an LTE system. FIG. 3(b) shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 3(a), the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3(b), the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, An RRC state of a UE and RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an 51 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Figure 4:
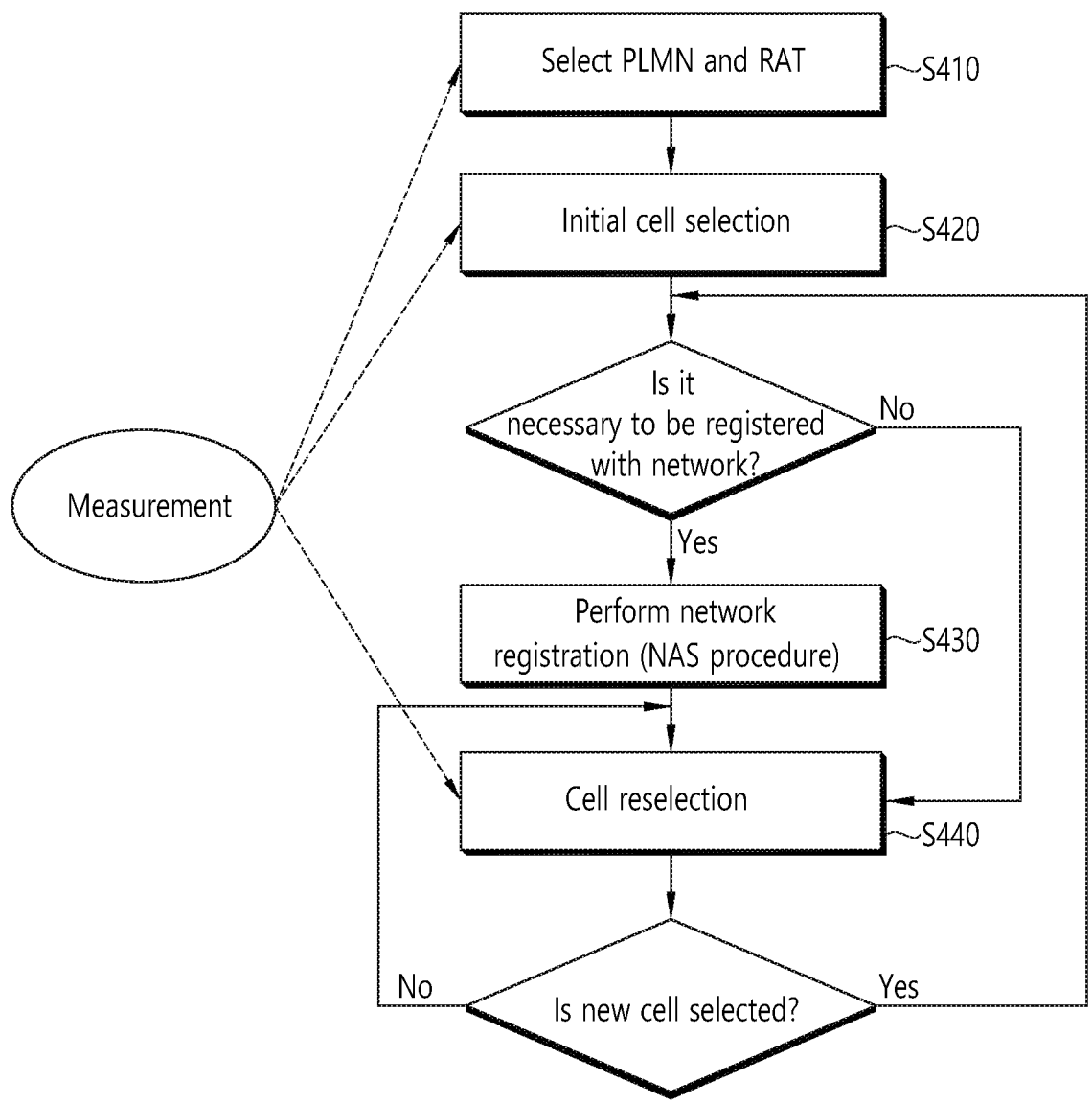
FIG. 4 shows a procedure in which UE that is initially powered on experiences a cell selection process, registers it with a network, and then performs cell reselection if necessary.

FIG. 4 shows a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.
Hereinafter, a Method and a Procedure of Selecting a Cell by the UE in a 3GPP LTE is Described.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each UE set by a network may refer to a dedicated priority. If receiving the dedicated priority, the UE may receive a valid time associated with the dedicated priority together. If receiving the dedicated priority, the UE starts a validity timer set as the received valid time together therewith. While the valid timer is operated, the UE applies the dedicated priority in the RRC idle mode. If the valid timer is expired, the UE discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking Performed in a Cell Reselection Evaluation Process is Described Below.

A ranking criterion used to apply priority to a cell is defined as in Equation 1.

$$R_S = Q_{meas,s} + Q_{hyst}, R_n = Q_{meas,n} - Q_{offset} \quad \text{[Equation 1]}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell. If a reselected cell is not a suitable cell, UE excludes a corresponding frequency or a corresponding cell from the subject of cell reselection.

Hereinafter, an MBMS and a Multicast/Broadcast Single Frequency Network (MBSFN) are Described.

MBSFN transmission or MBSFN-mode transmission refers to a simultaneous transmission scheme in which a plurality of cells transmits the same signal at the same time. MBSFN transmissions from a plurality of cells within an MBSFN area are perceived as a single transmission for a UE.

The MBMS service may be managed or localized in a cell-based or geography-based manner. An area in which a specific MBMS service is provided is widely referred to as an MBMS service area. For example, if an area in which a specific MBSMS service A proceeds is an MBMS service area A, a network in the MBMS service area A may be in a state of transmitting the MBMS service A. In this case, the UE may receive the MBMS service A according to a UE capability. The MBMS service area may be defined in terms of an application and a service as to whether a specific service is provided in a specific area.

A transport channel for the MBMS, that is, a multicast channel (MCH), may be mapped to a logical channel, e.g., a multicast control channel (MCCH) or a multicast traffic channel (MTCH). The MCCH transmits an MBMS-related RRC message, and the MTCH transmits a traffic of a specific MBMS service. One MCCH exists in every one MBMS single frequency network (MBSFN) region for transmitting the same MBMS information/traffic. The MCCH includes one MBSFN region configuration RRC message, and has a list of all MBMS services. If the MBMS-related RRC message is changed in a specific MCCH, a physical downlink control channel (PDCCH) transmits an MBMS radio network temporary identity (M-RNTI) and an indication for indicating the specific MCCH. The UE which supports the MBMS may receive the M-RNTI and the MCCH indication through the PDCCH, may recognize that the MBMS-related RRC message is changed in the specific MCCH, and may receive the specific MCCH. The RRC message of the MCCH may be changed in every modification period, and is broadcast repetitively in every repetition period. A notification mechanism is used to inform an MCCH change caused by a presence of an MCCH session start or MBMS counting request message. The UE detects the MCCH change informed without having to depend on the notification mechanism through MCCH monitoring in the modification period. The MTCH is a logical channel on which an MBMS service carried. If many services are provided in an MBSFN region, a plurality of MTCHs may be configured.

A UE may also be provided with a dedicated service while being provided with an MBMS service. For example, a user may chat on the user's own smartphone using an instant messaging (IM) service, such as MSN or Skype, simultaneously with watching a TV on the smartphone through an MBMS service. In this case, the MBMS service is provided through an MTCH received by a plurality of UEs at the same time, while a service provided for each individual UE, such as the IM service, is provided through a dedicated bearer, such as a dedicated control channel (DCCH) or dedicated traffic channel (DTCH).

In one area, a BS may use a plurality of frequencies at the same time. In this case, in order to efficiently use radio resources, a network may select one of the frequencies to provide an MBMS service only in the frequency and may provide a dedicated bearer for each UE in all frequencies. In this case, when a UE, which has been provided with a service using a dedicated bearer in a frequency where no MBMS service is provided, wishes to be provided with an MBMS service, the UE needs to be handed over to an MBMS providing frequency. To this end, the UE transmits an MBMS interest indication to a BS. That is, when the UE wishes to receive an MBMS service, the UE transmits an MBMS interest indication to the BS. When the BS receives the indication, the BS recognizes that the UE wishes to receive the MBMS service and hands the UE over to an MBMS providing frequency. Here, the MBMS interest indication is information indicating that the UE wishes to receive an MBMS service, which additionally includes information on a frequency to which the UE wishes to be handed over.

The UE, which wishes to receive a specific MBMS service, first identifies information on a frequency at which the specific service is provided and information on broadcast time at which the specific service is provided. When the MBMS service is already on air or is about to be on air, the UE assigns the highest priority to the frequency at which the MBMS service is provided. The UE performs a cell reselection procedure using reset frequency priority information and moves to a cell providing the MBMS service to receive the MBMS service.

When the UE is receiving an MBMS service or is interested in receiving an MBMS service and when the UE is allowed to receive an MBMS service while camping on an MBMS service-providing frequency, it may be considered that the frequency is assigned the highest priority during an MBMS session as long as the following situations last while the reselected cell is broadcasting SIB13.

When SIB15 of a serving cell indicates that one or more MBMS service area identities (SAIs) are included in the user service description (USD) of the service.

SIB15 is not broadcast in a serving cell, and the frequency is included in the USD of the service.

A UE needs to be able to receive an MBMS in RRC_IDLE and RRC_CONNECTED states.

Figure 5:
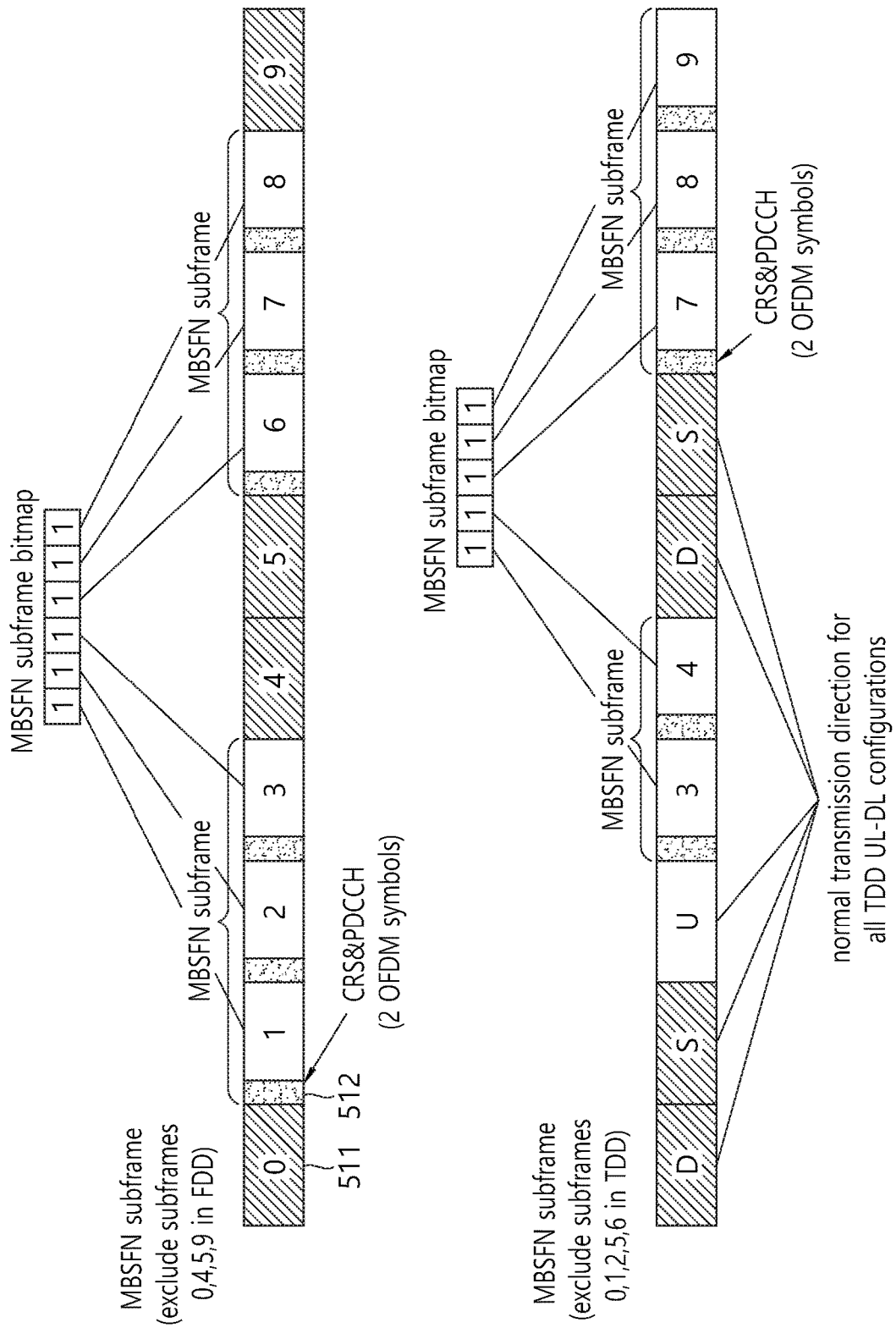
FIG. 5 shows a structure of an MBSFN subframe.

FIG. 5 shows a structure of an MBSFN subframe.

Referring to FIG. 5, MBSFN transmission is configured by the subframe. A subframe configured to perform MBSFN transmission is referred to as an MBSFN subframe. In a subframe configured as an MBSFN subframe, MBSFN transmission is performed in OFDM symbols other than first two OFDM symbols for PDCH transmission. For convenience, a region used for MBSFN transmission is defined as an MBSFN region. In the MBSFN region, no CRS for unicast is transmitted but an MBMS-dedicated RS common to all cells participating in transmission is used.

In order to notify even a UE receiving no MBMS that no CRS is transmitted in the MBSFN region, system information on a cell is broadcast including configuration information on the MBSSFN subframe. Since most UEs perform radio resource management (RRM), radio link failure (RLF) processing, and synchronization using a CRS, it is important to indicate the absence of a CRS in a specific region. A CRS is transmitted in first two OFDM symbols used as a PDCCH in the MBSFN subframe, and this CRS is not for an MBSFN. A CP of the CRS transmitted in the first two OFDM symbols used as the PDCCH in the MBSFN subframe (that is, whether the CRS uses a normal CP or an extended CP) follows a CP applied to a normal subframe, that is, a subframe which is not an MBSFN subframe. For example, when a normal subframe 511 uses a normal CP, a CRS according to the normal CP is also used in the first two OFDM symbols 512 of the MBSFN subframe.

Meanwhile, a subframe to be configured as an MBSFN subframe is designated by FDD and TDD, and a bitmap is used to indicate whether a subframe is an MBSFN subframe. That is, when a bit corresponding to a specific subframe in a bitmap is 1, it is indicated that the specific subframe is configured as an MBSFN subframe.

Figure 6:
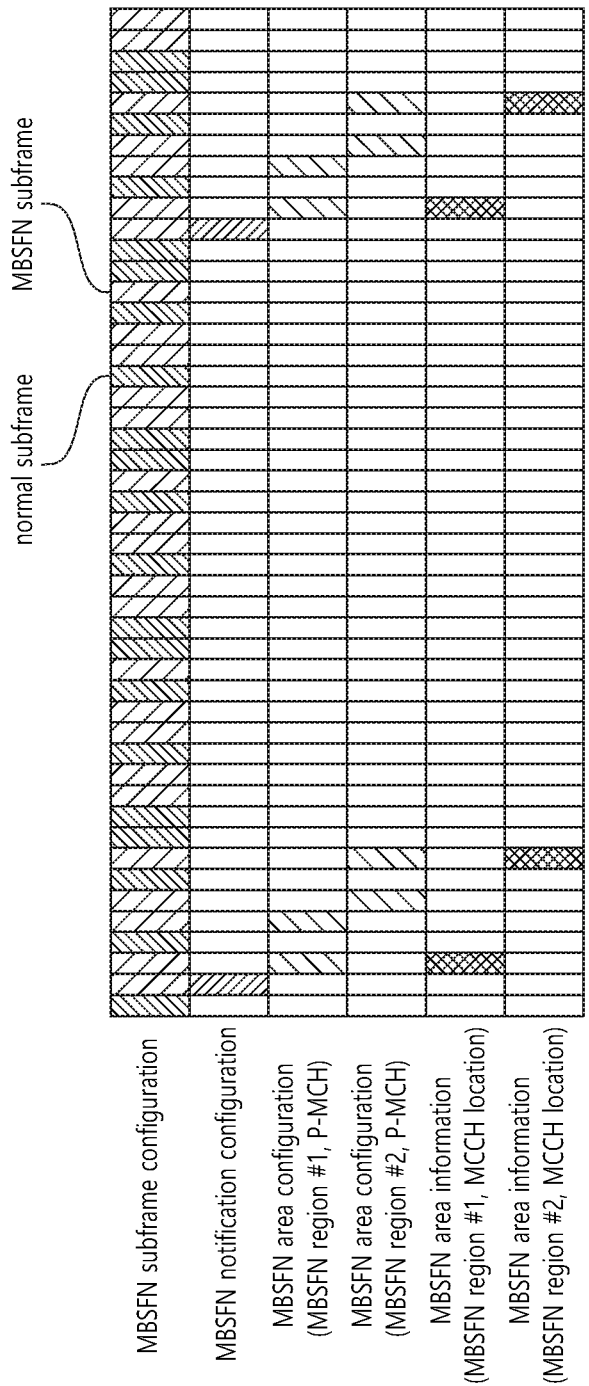
FIG. 6 shows an example of an MBSFN subframe configuration for performing an MBMS service.

FIG. 6 shows an example of an MBSFN subframe configuration for performing an MBMS service.

Referring to FIG. 6, a UE acquires MBSFN subframe configuration information, MBSFN notification configuration information, and MBSFN area information list to perform the MBMS service.

The UE may know the MBSFN subframe configuration information, that is, a position of an MBSFN subframe, through SIB2 and RRC dedicated signaling. For example, the MBSFN subframe configuration information may be included in an MBSFN-SubframeConfig information element (IE).

In addition, the UE may acquire the MBSFN area information list and the MBMS notification configuration information as information required to acquire MBMS control information related to one or more MBSFN regions in which the MBMS service can be performed through SIB13. Herein, for each MBSFN region, the MB SFN area information list may include an MBSFN region ID, information regarding an MBSFN region in an MBSFN subframe in a corresponding MBSFN region, information such as an MBSFN subframe position at which transmission of an MCCH occurs as an MBMS control information channel, or the like. For example, the MBSFN area information list may be included in an MBSFN-AreaInfoList information element. Meanwhile, the MBSFN notification configuration information is configuration information for a subframe position at which an MBMS notification occurs to inform that there is a change in the MBSFN region configuration information. For example, the MBSFN notification configuration information may be included in an MBMS-NotificationConfig information element. The MBSFN notification configuration information includes time information utilized to notify an MCCH change applicable to all MBSFN regions. For example, the time information may include a notification repetition coefficient (notificationRepetitionCoeff), a notification offset (notificationOffset), and a notification subframe index (notificationSF-Index). Herein, the notification repetition coefficient implies a common notification repetition period for all MCCHs. The notification offset indicates an offset of a radio frame in which the MCCH change notification information is scheduled. In addition, the notification subframe index is a subframe index used to transmit an MCCH change notification on a PDCCH.

The UE may acquire the MBSFN region configuration information through an MCCH corresponding to each of the MBSFN regions acquired through SIB13. The MBSFN region configuration information may be included in an MBSFNAreaconfiguration message, and contains information regarding physical multicast channels (PMCHs) used in a corresponding MBSFN region. For example, information regarding each PMCH may include a position of an MBSFN subframe in which a corresponding PMCH is located, modulation and coding scheme (MCS) level information used for data transmission in a corresponding subframe, MBMS service information transmitted by the corresponding PMCH, or the like.

The UE receives MCH data through the MTCH on the basis of the PMCH. Scheduling on a time for the MCH data may be known through MCH scheduling information (MSI) delivered through the PMCH. The MSI contains information regarding how long corresponding MCH data transmission is continued.

Hereinafter, Single-Cell Point-to-Multipoint (SCPTM) Transmission is Described.

A transmission method of an MBMS service includes SCPTM transmission and multimedia broadcast multicast service single frequency network (MBSFN) transmission. While identifiable signals are transmitted simultaneously in a plurality of cells in the MBSFN transmission, the MBMS service is transmitted in a single cell in the SCPTM transmission. Therefore, unlike in the MBSFN transmission, synchronization between cells is not necessary in the SCPTM transmission. Further, the SCPTM transmission directly uses the existing PDSCH, and thus has a unicast feature unlike in the MBSFN transmission. That is, a plurality of UEs read the same PDCCH, and acquire an RNTI for each service to receive an SCPTM service. An SCPTM-dedicated MCCH is introduced, and if it is determined that a service desired by the UE is an SCPTM service through the MCCH, the UE may acquire a corresponding RNTI value and read a PDCCH through a corresponding RNTI to receive the SCPTM service.

In case of a UE which receives a service through SCPTM in an RRC_IDLE mode, if the UE performs cell reselection to another cell which does not provide the service through the SCPTM, the UE may experience a service failure until the service is received through unicast. Therefore, there is a need to newly propose a cell reselection procedure for a UE which is interested in receiving the SCPTM service. Herein, a method of performing cell reselection by a UE, and an apparatus supporting the method are proposed according to an embodiment of the present invention.

In the present specification, a service of interest may imply an SCPTM service of which reception is interested by the UE or an SCPTM service which is being received by the UE. The SCPTM service may imply a service received by the UE through SCPTM. In the present specification, an SCPTM cell of interest may imply a cell which provides the SCPTM service. In the present invention, a frequency of interest may imply a frequency of a carrier on which the SCPTM cell of interest is arranged. For example, the SCPTM cell of interest may imply a cell belonging to the frequency of interest.

Figure 7:
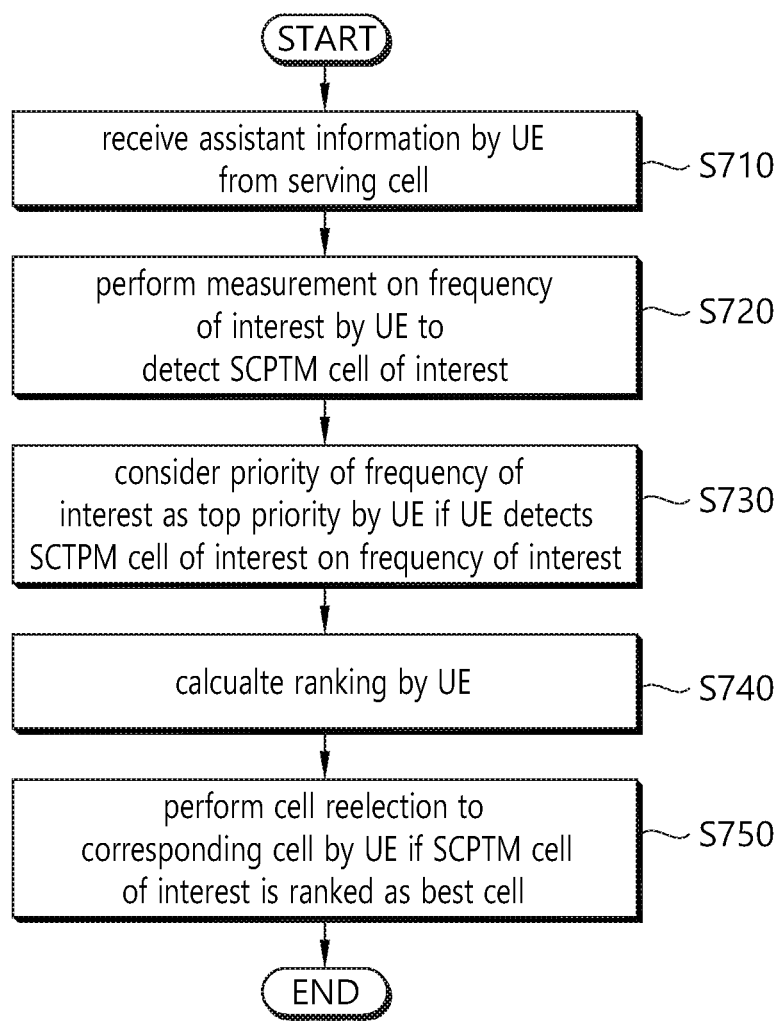
FIG. 7 shows a method of performing cell reselection by a UE according to an embodiment of the present invention.

FIG. 7 shows a method of performing cell reselection by a UE according to an embodiment of the present invention.

(1) In step S710, the UE may receive assistant information from a serving cell. The assistant information may be information for continuity of an SCPTM service. The assistant information may be a system information block. The assistant information may be broadcast in the serving cell. The UE may be in an RRC_IDLE mode.

The assistant information may include a mapping relation between a cell ID and a service area identity (SAI). For convenience of explanation, the assistant information including the mapping relation between the cell ID and the SAI is defined as first assistant information. For example, the first assistant information may include a neighboring cell list for each SAI. For example, the first assistant information may include an SAI list for each neighboring cell ID.

The assistant information may include a mapping relation between a cell ID and a temporary mobile group identifier (TMGI). For convenience of explanation, the assistant information including the mapping relation between the cell ID and the TMGI is defined as second assistant information. For example, the second assistant information may include a neighboring cell list for each TMGI. For example, the second assistant information may include a TMGI list for each neighboring cell ID.

In step S710, carrier frequency information may be provided together with the cell ID of the assistant information. Alternatively, a cell specific priority (CSP) value may be provided together with the cell ID of the assistant information. Alternatively, the carrier frequency information and the CSP value may be provided together with the cell ID of the assistant information. The CSP implies a priority provided for each cell, and is a concept differentiated from a frequency specific priority provided for each frequency. For example, one carrier frequency and one cell specific priority may be provided for each cell. For example, one CSP may be mapped to a plurality of cells.

In step S710, a UE behavior based on the first assistant information may be as follows. The UE may acquire mapping information between the SAI and the TMGI from a user service description (USD). The UE may know the SAI to which a service of interest belongs. Thereafter, the UE may read the first assistant information received from a serving cell. In addition, the UE may know a neighboring cell having the SAI. The UE may know whether an SCPTM cell of interest exists near the UE, and may know which neighboring cell is the SCPTM cell of interest. In addition, the UE may know a CSP corresponding to the SCPTM cell of interest and a carrier frequency corresponding to the SCPTM cell of interest.

In step S710, a UE behavior based on the second assistant information may be as follows. The UE may read the second assistant information received from the serving cell. In addition, the UE may know whether an SCPTM cell of interest exists near the UE, and may know which neighboring cell is the SCPTM cell of interest. In addition, the UE may know a CSP corresponding to the SCPTM cell of interest and a carrier frequency corresponding to the SCPTM cell of interest.

(2) In step S720, the UE may perform measurement on a frequency of interest to detect the SCPTM cell of interest. The SCPTM cell of interest may be a cell distributed on the frequency of interest.

The UE may set a priority of the frequency of interest to the highest priority. In addition, the UE may perform intra-frequency measurement and inter-frequency measurement. For example, a UE which is interested in receiving a specific SCPTM service may consider a priority of a frequency including a cell which provides the SCPTM service as the highest priority, and the UE may perform the intra-frequency measurement and the inter-frequency measurement. If the UE supports continuity of the SCPTM service, if the UE is interested in receiving of the SCPTM service or is receiving the SCPTM service, and if the UE can receive only the SCPTM service while camping on a frequency at which the SCPTM service is provided, the UE may consider the frequency as the highest priority.

Alternatively, the UE may additionally perform measurement on a frequency of interest to detect the SCPTM cell of interest. The UE may perform measurement by ignoring a priority for the frequency of interest. Alternatively, despite RSRP/RSRQ of the serving cell and the priority of the frequency of interest, the UE may perform measurement on the frequency of interest to detect the SCPTM cell of interest. In order for the UE to detect the SCTPM cell of interest, the frequency priority may not be considered.

(3) In step S730, if the UE detects the SCPTM cell of interest on the frequency of interest, the UE may consider the priority of the frequency of interest as the highest priority. That is, the UE may set the priority of the frequency of interest to the highest priority. If there is a plurality of frequencies of interest and if the UE cannot detect the SCPTM cell of interest on a first frequency of interest, the UE may measure a next frequency of interest to detect the SCPTM cell of interest.

(4) In step S740, the UE may calculate a ranking. A CSP for SCPTM may be used in the ranking calculation. A ranking for the SCPTM cell of interest may be calculated by applying the CSP. In step S710, the CSP applied to the ranking calculation of the SCPTM cell of interest may be provided together with the assistant information. For example, a cell-ranking criterion for serving cell (Rs) and a cell-ranking criterion for neighboring cell (Rn) may be defined by Equation 2.

$$Rs = Q\text{meas},s + Q\text{Hyst} - Q\text{offsettemp}$$

$$Rn = Q\text{meas},n - Q\text{offset} - Q\text{offsettemp} + CSP \quad \text{[Equation 2]}$$

Qmeas is RSRP measurement quantity used in cell reselection. Qmeas,s is RSRP measurement quantity for a serving cell used in cell reselection. Qmeas,n is RSRP measurement quantity for a neighboring cell used in cell reselection. In case of intra frequency, if Qoffsets,n is valid, Qoffset is equal to Qoffsets,n, and if Qoffsets,n is not valid, Qoffset is 0. In case of inter-frequency, if Qoffsets,n is valid, Qoffset is equal to a value obtained by adding Qoffsetfrequency to Qoffsets,n, and if Qoffsets,n is not valid, Qoffset is equal to Qoffsetfrequency. Qoffsets,n is an offset between two cells. Offsettemp is an offset applied temporarily to the cell. The CSP is a cell-specific priority for the SCPTM cell of interest. The CSP for a cell other than the SCPTM cell of interest may be 0.

The UE may calculate a ranking for all cells which satisfy a cell selection criterion S. The ranking of the cell may be calculated according to Equation 2 above. An average RSPR result may be used to derive Qmeas,s and Qmeas,n, and a ranking value may be calculated. The cell selection criterion used by the UE in cell selection may be defined by Equation 3.

$$Srxlev > 0 \text{ and } Squal > 0 \quad \text{[Equation 3]}$$

Srxlev denotes a cell selection RX level value (dB), and may be defined by Equation 4 below. Squal denotes a cell selection quality value (dB), and may be defined by Equation 5 below.

$$Srxlev = Qrxlevmeas - (Qrxlevmin + Qrxlevminoffset) - Pcompensation - Qoffsettem \quad \text{[Equation 4]}$$

Qrxlevmeas is a downlink RX power value obtained when the UE measures a downlink RX channel in practice, Qrxlevmin is a minimum downlink RX power requirement level required to select a corresponding cell, Qrxlevminoffset is a threshold value which is added to Qrxlevmin only when the UE is in a visited public land mobile network (VPLMN) and periodically searches for a public land mobile network (PLMN, a communication operator) having a higher priority, Pcompensation is a threshold value for considering an uplink channel state, and Qoffsettemp is an offset applied temporarily to a cell.

$$Squal=Qqualmeas-(Qqualmin+Qqualminoffset)-Qoffsettemp \quad \text{[Equation 5]}$$

Qqualmeas is a value obtained by calculating a ratio of RX signal strength at which the UE measures a downlink RX channel in practice with respect to a total noise measured in practice, Qqualmin is a minimum signal-to-noise ratio required to select a corresponding cell, Qqualminoffset is a threshold which is added to Qqualmin only when the UE is in the VPLMN and periodically searches for the PLMN having a higher priority, and Qoffsettemp is an offset applied temporarily to a cell.

Referring to Equation 3 above, the cell selection criterion may be satisfied when both Srxlev and Squal are greater than 0. That is, when both RSPR and RSRQ of a measured cell are greater than or equal to a specific level, the UE may determine that the cell has a basic possibility for cell selection. In particular, Squal is a parameter corresponding to RSRQ. That is, Squal is not simply a value associated with a power magnitude measured in a cell but a value calculated in association with power quality. If Squal>0, the cell selection criterion may be satisfied in terms of quality of the cell. The cell selection criterion for RSRP may be satisfied only when the measured RSRQ is greater than or equal to a value obtained by adding Qqualmin and Qqualminoffset.

Referring to Equation 2, the CSP may be additionally applied in the ranking calculation. For example, if a neighboring cell is a cell which provides an SCPTM service and the UE is interested in the SCPTM service, the UE may additionally consider the CSP in the ranking calculation of the neighboring cell. That is, the CSP may be additionally considered when Rn is calculated. Therefore, a probability that the UE performs cell selection to the neighboring cell may be increased, and the UE which has performed the cell reselection to the neighboring cell may receive the SCPTM service of interest in the neighboring cell.

(5) In step S750, if the SCPTM cell of interest is ranked to a best cell, the UE may perform cell reselection to the cell. In addition, the UE may receive a service of interest through SCPTM. If the UE fails to detect the cell in step S730 or if the SCPTM cell of interest is not a cell having the highest priority in step S740, the UE may return to a cell selection priority determined by a network. If the SCPTM cell is a cell having a highest ranking while the service of interest is provided through SCPTM from the SCPTM cell of interest on a frequency of interest, the UE may consider the frequency of interest as the highest priority.

According to an embodiment of the present invention, if the CSP is applied to the ranking calculation for the cell which provides the SCPTM service of interest, it is possible to increase a probability that the UE performs cell reselection to the cell which provides the SCPTM service of interest. Therefore, it is possible to avoid a service failure which may occur when the UE performs cell reselection to a cell which does not provide the SCPTM service of interest.

Figure 8:
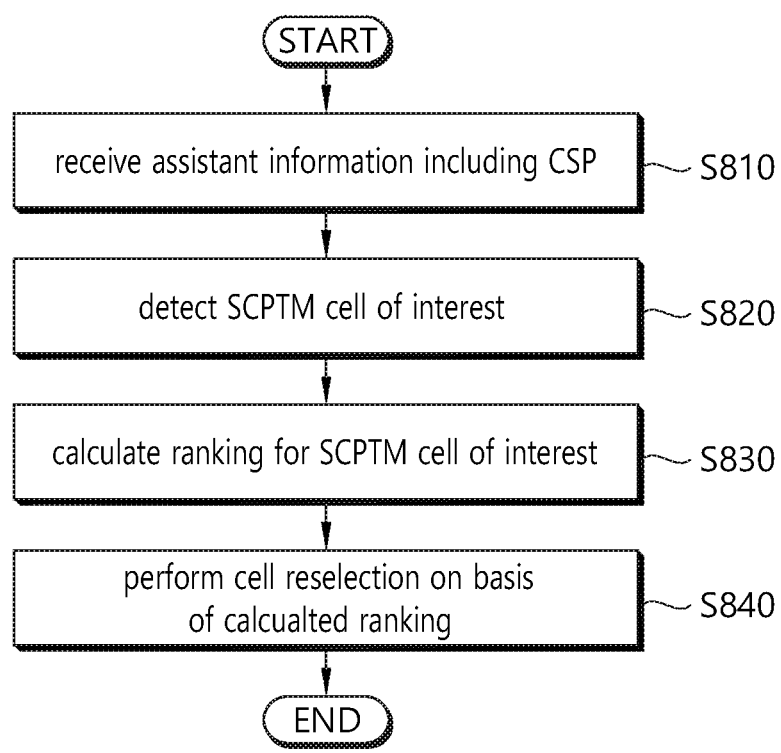
FIG. 8 is a block diagram showing a method of performing cell reselection by a UE according to an embodiment of the present invention.

FIG. 8 is a block diagram showing a method of performing cell reselection by a UE according to an embodiment of the present invention.

Referring to FIG. 8, in step S810, the UE may receive assistant information including a cell specific priority (CSP). The UE may determine whether an SCPTM cell of interest exists near the UE on the basis of the assistant information. If it is determined that the SCPTM cell of interest exists near the UE, the UE may perform measurement on a frequency to which the SCTPM cell of interest belongs. The assistant information may include a mapping relation between a cell ID and a service area identify (SAI) and a CSP corresponding to the cell ID. The assistant information includes a mapping relation between a cell ID and a temporary mobile group identifier (TMGI) and a CSP corresponding to the cell ID.

In step S820, the UE may detect a single-cell point-to-multipoint (SCPTM) cell of interest. The SCPTM cell of interest may be a cell which provides an SCPTM service of which reception is interested by the UE or an SCPTM service which is being received by the UE.

In step S830, the UE may calculate a ranking for the SCPTM cell of interest. The ranking for the SCPTM cell of interest may be calculated by applying the CSP. The UE may calculate a ranking for the remaining cells other than the SCPTM cell of interest, and may calculate the ranking for the remaining cells without having to apply the CSP.

The ranking for the SCPTM cell of interest is defined by:

$$R=Qmeas-Qoffset-Qoffsettemp+CSP,$$

where R is a ranking for the SCPTM cell of interest, Qmeas is RSRP measurement quantity used in cell reselection, Qoffset is an offset applied to a cell, Qoffsettemp is an offset applied temporarily to the cell, and CSP is a CSP for the SCPTM cell of interest.

In step S840, the UE may perform cell reselection on the basis of the calculated ranking.

The UE may perform measurement on a frequency of interest, and the frequency of interest is a frequency to which the SCPTM cell of interest belongs. A priority of the frequency of interest may be considered by the UE as the highest priority. Alternatively, the priority of the frequency of interest, RSRP of a serving cell, and RSPR of the serving cell may not be considered in the measurement on the frequency of interest.

If the calculated ranking for the SCPTM cell of interest is high, the cell reselection may be performed to the SCPTM cell of interest. The UE may receive the SCPTM service of interest from the SCPTM cell of interest, and a priority of a frequency to which the SCPTM cell of interest belongs may be considered by the UE as the highest priority while the SCPTM service of interest is received.

Figure 9:
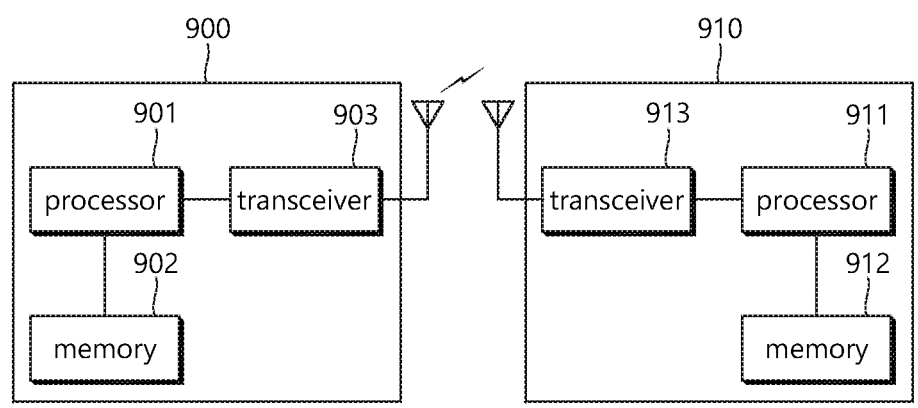
FIG. 9 is a block diagram illustrating a wireless communication system according to the embodiment of the present invention.

FIG. 9 is a block diagram illustrating a wireless communication system according to the embodiment of the present invention.

A BS 900 includes a processor 901, a memory 902, and a transceiver 903. The memory 902 is connected to the processor 901, and stores various information for driving the processor 901. The transceiver 903 is connected to the processor 901, and transmits and/or receives radio signals. The processor 901 implements proposed functions, processes and/or methods. In the above embodiment, an operation of the base station may be implemented by the processor 901.

A UE 910 includes a processor 911, a memory 912, and a transceiver 913. The memory 912 is connected to the processor 911, and stores various information for driving the processor 911. The transceiver 913 is connected to the processor 911, and transmits and/or receives radio signals. The processor 911 implements proposed functions, processes and/or methods. In the above embodiment, an operation of the UE may be implemented by the processor 911.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method performed by a wireless device in a wireless communication system, the method comprising:
   receiving offset information from a serving cell that the wireless device is camping on;
   calculating a ranking for a neighbor cell based on the offset information; and
   performing a cell reselection based on the calculated ranking,
   wherein the offset information includes a first offset applied to a measurement result of the neighbor cell in dependence on whether a frequency on which the neighbor cell is configured is an inter-frequency or an intra-frequency of the serving cell,
   wherein the offset information further includes a second offset applied to the measurement result of the neighbor cell temporarily, and
   wherein the offset information further includes a third offset applied to the measurement result of the neighbor cell when the neighbor cell is a single cell point to multipoint (SCPTM) cell.

2. The method of claim 1, wherein the neighbor cell is a cell which provides a multimedia broadcast multicast service (MBMS) service via SCPTM transmission.

3. The method of claim 1, wherein the neighbor cell is configured on a SCPTM frequency.

4. The method of claim 1, wherein the third offset for the neighbor cell is defined as a cell specific priority (CSP) value.

5. The method of claim 1, further comprising:
   receiving a multimedia broadcast multicast service (MBMS) service via the neighbor cell, if the cell reselection is performed to the neighbor cell.

6. The method of claim 1, wherein if the calculated ranking for the neighbor cell is highest among all neighbor cells, the cell reselection is performed to the neighbor cell.

7. The method of claim 1, wherein the ranking for the neighbor cell is defined by:

$R = Q\text{meas} - Q\text{offset} - Q\text{offsettemp} + CSP$, where R denotes the ranking for the neighbor cell, Qmeas denotes the measurement result of the neighbor cell, Qoffset denotes the first offset, Qoffsettemp denotes the second offset, and CSP denotes the third offset.

8. The method of claim 1, further comprising calculating a ranking for a non-SCPTM cell,
   wherein the ranking for the non-SCPTM cell is calculated without the third offset.

9. The method of claim 1, further comprising:
   performing measurement on a SCPTM frequency on which a SCPTM cell of interest is configured; and
   detecting the SCPTM cell of interest on the SCPTM frequency.

10. A wireless device in a wireless communication system, the wireless device comprising:
    a memory;
    a transceiver; and
    a processor coupled to the memory and the transceiver,
    wherein the processor is configured to:
    control the transceiver to receive offset information from a serving cell that the wireless device is camping on;
    calculate a ranking for a neighbor cell based on the offset information; and
    perform a cell reselection based on the calculated ranking,
    wherein the offset information includes a first offset applied to a measurement result of the neighbor cell in dependence on whether a frequency on which the neighbor cell is configured is an inter-frequency or an intra-frequency of the serving cell,
    wherein the offset information further includes a second offset applied to the measurement result of the neighbor cell temporarily, and
    wherein the offset information further includes a third offset applied to the measurement result of the neighbor cell when the neighbor cell is a single cell point to multipoint (SCPTM) cell.

11. The wireless device of claim 10, wherein the neighbor cell is a cell which provides a multimedia broadcast multicast service (MBMS) service via SCPTM transmission.

12. The wireless device of claim 10, wherein the neighbor cell is configured on a SCPTM frequency.

13. The wireless device of claim 10, wherein the third offset for the neighbor cell is defined as a cell specific priority (CSP) value.

14. The wireless device of claim 10, wherein the processor is further configured to:
    control the transceiver to receive a multimedia broadcast multicast service (MBMS) service via the neighbor cell, if the cell reselection is performed to the neighbor cell.

15. The wireless device of claim 10, wherein if the calculated ranking for the neighbor cell is highest among all neighbor cells, the cell reselection is performed to the neighbor cell.

* * * * *